March 19, 1957 J. A. PETRIE 2,785,550
ROTARY DRIVE-TRANSMITTING COUPLING ARRANGEMENTS
Filed July 8, 1953 2 Sheets-Sheet 1
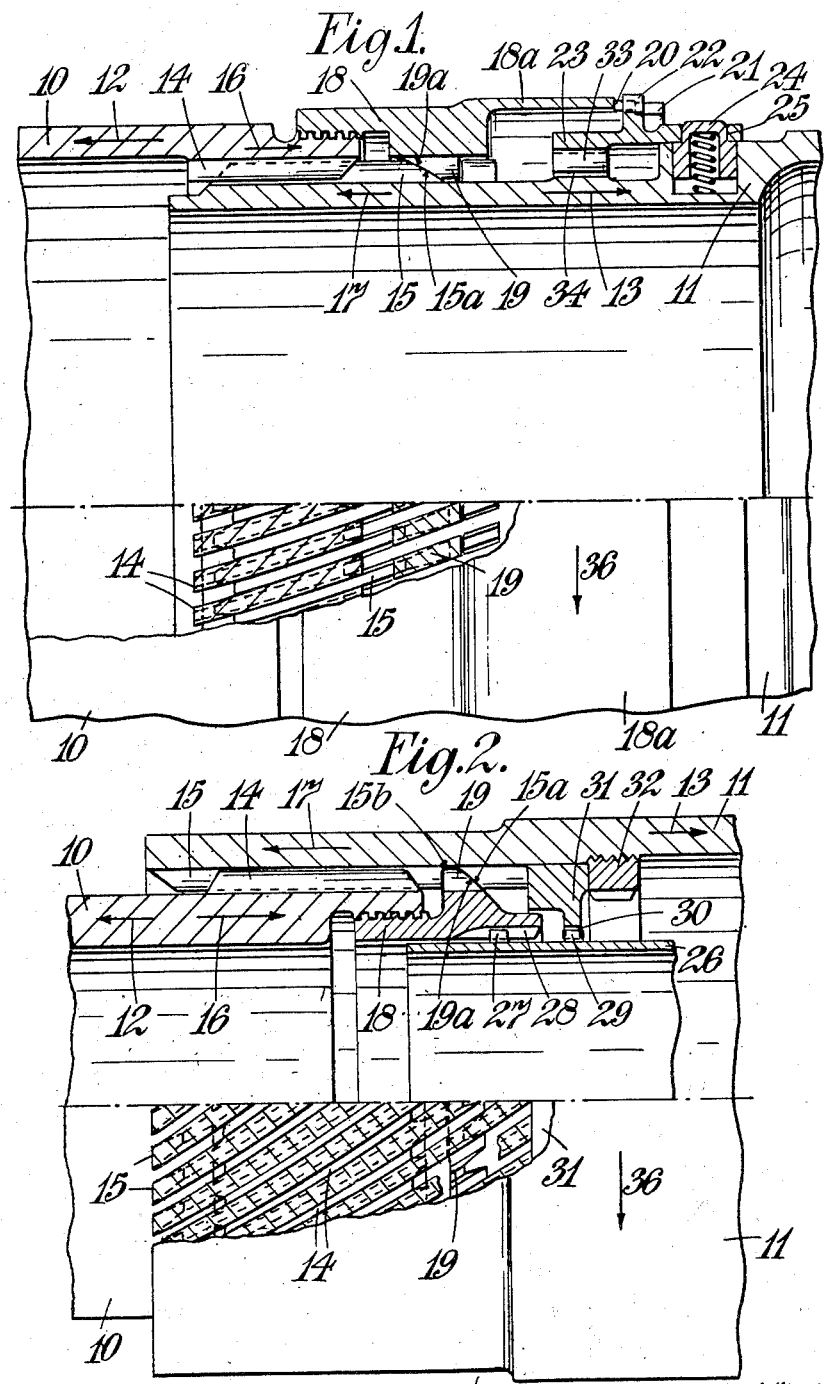

March 19, 1957  J. A. PETRIE  2,785,550
ROTARY DRIVE-TRANSMITTING COUPLING ARRANGEMENTS
Filed July 8, 1953  2 Sheets-Sheet 2
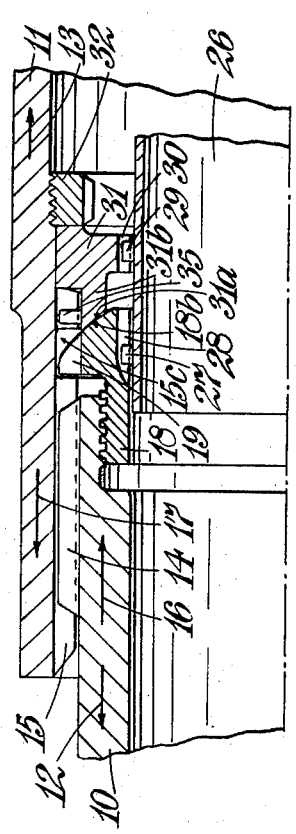
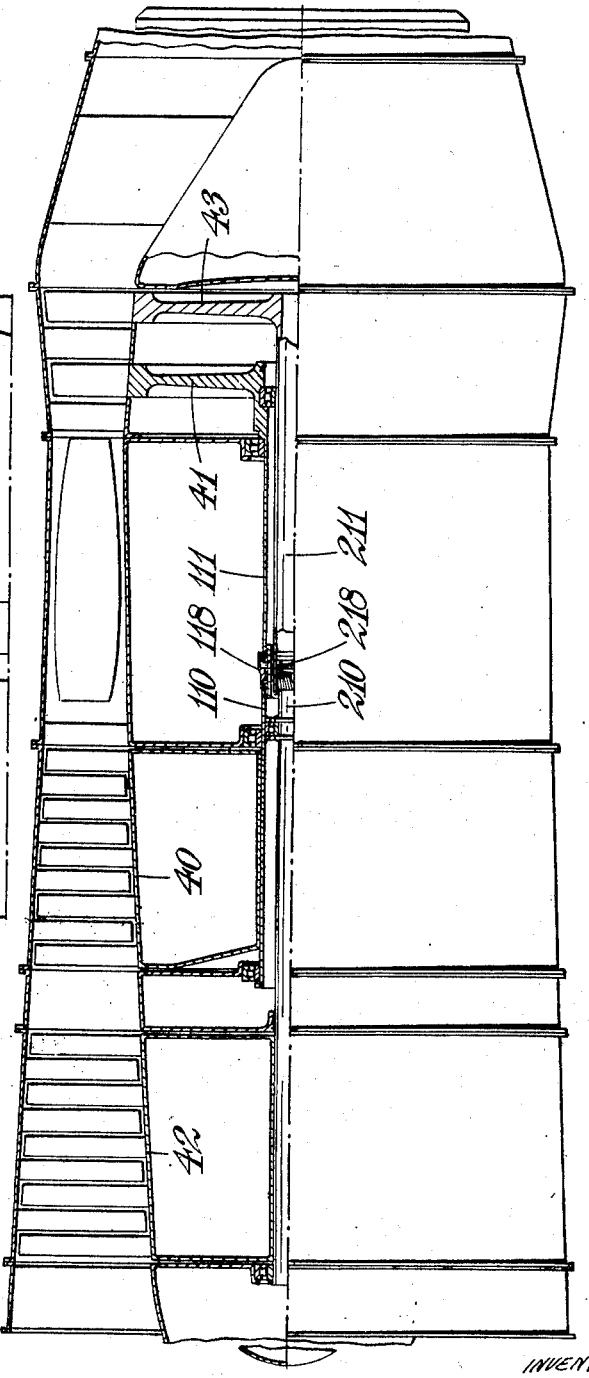
INVENTOR
J. A. PETRIE

United States Patent Office 2,785,550
Patented Mar. 19, 1957

2,785,550

ROTARY DRIVE-TRANSMITTING COUPLING ARRANGEMENTS

James Alexander Petrie, Littleover, Derby, England, assignor to Rolls-Royce Limited, Derby, England, a British company Application July 8, 1953, Serial No. 366,850

Claims priority, application Great Britain July 25, 1952

15 Claims. (Cl. 64—9)

This invention relates to rotary drive-transmitting coupling arrangements and is more particularly concerned with a coupling of the kind (hereinafter referred to as the kind specified), which is capable of transmitting a drive between the coupled parts whilst accommodating slight misalignment of the rotational axes of the coupled parts and which is loaded in tension or compression due to resultant axial loads on the coupled parts. Such a coupling is suitable, for instance, for drivingly interconnecting turbine and compressor shafts of a gas-turbine engine, and in such use the coupling will usually be in tension since the resultant loads on the shafts due to the operation of the compressor and turbine are usually in each case away from the coupling.

A coupling of the kind specified for coupling turbine and compressor shafts of a gas-turbine engine usually comprises a splined interconnecting means having straight axial splines to transmit the drive and a ball-and-socket type connection for accommodating any slight misalignment of the shafts and to take the axial loads on the coupling. Owing to the high axial loads experienced in operation, the cooperating spherical surfaces of the ball-and-socket type connection are given large effective contact areas as projected onto a plane at right angles to the axis of rotation of the coupling, and usually the co-operating spherical surfaces are equatorial zones of a sphere and the large effective contact areas are obtained by giving the spherical surfaces a large diameter. As a result a coupling of the kind specified has heretofore had a large radial dimension.

This invention has for an object to provide a coupling of the kind specified whereof the radial dimension may be substantially reduced.

According to the present invention, a coupling of the kind specified comprises a ball-and-socket type connection and a splined interconnection afforded by cooperating helical splines of such hand that, during torque transmission, axial loads are caused opposing the loads applied by the coupled parts on the cooperating spherical surfaces of the ball-and-socket type connection. By adopting the arrangement of the present invention the effective load of the cooperating spherical surfaces of the ball-and-socket connection may be substantially reduced and thus the projected area of the cooperating spherical surfaces and the over-all radial dimension of the coupling may also be reduced as compared with a corresponding coupling having straight axial splines.

Preferably it is arranged that the axial loading due to the helical splines is a finite amount greater than or less than the loadings due to the coupled parts so that there is a finite loading of the cooperating spherical surfaces of the ball-and-socket interconnection the direction of action of which is known.

According to a preferred feature of this invention, one of the cooperating spherical surfaces is formed on a third part having helical splined portions, which third part is mounted on and adjustable relative to one of the coupled parts so that the helical splined portions can be brought into line with the splines on either of the coupled parts, and locking means is provided to lock the third part with its splined portions in alignment with the splines on the other of the coupled parts, which locking means is releasable to permit the splined portions on the third part to be brought into line with the splines on said one of the coupled parts.

In one arrangement according to this feature of the invention, the cooperating spherical surfaces are provided on the ends of the helical splined portions of the third part and on the helical splines of the other of the coupled parts. In a second arrangement according to this feature of the invention, the spherical surfaces which cooperate with those on the third part are formed on an annular member which is separate from said other of the coupled parts, but secured against movement relative thereto.

The third part is conveniently screw-threaded to the said one of the coupled parts.

With this preferred arrangement, when the helical splines on the coupled parts are being engaged or disengaged, the locking means is rendered inoperative and the splines on the third part are brought into alignment with the helical splines on the said one of the coupled parts, but when the coupling is engaged the helical spline portions on the third part are aligned with the helical splines on the other of the coupled parts and the locking means is operative to prevent the splines coming out of alignment.

Some embodiments of this invention will now be described which embodiments are illustrated respectively in the accompanying drawings in which, Figure 1 is a view partly in axial section through a coupling in accordance with the invention, Figure 2 is a view corresponding to Figure 1 of a second embodiment, Figure 3 is a view corresponding to Figure 1 of a third embodiment, and Figure 4 is an illustration of the use of the couplings.

Referring to Figure 1, there is shown an arrangement which is suitable for use when the load caused by the helical splines is less than a load tending to separate the coupled parts so that the resultant load on the ball-and-socket type connection is one tending to separate the coupled parts.

Referring now to Figure 1, the parts to be coupled are indicated as a shaft 10 which may, for instance, be a compressor shaft of a gas-turbine engine, and a shaft 11 which may, for instance, be the shaft of a turbine for driving the compressor. In this application there will be a load on the shaft 10, due say to the compressor operation, acting in the direction of arrow 12 and there will be a load, due say to the turbine operation, acting on the turbine shaft 11 in the direction of arrow 13, these loads tending to separate the shafts.

The shaft 10 has formed internally of it at its end a set of helical splines 14 and the shaft 11 engages by its end within the end of the shaft 10 and is formed externally with a set of helical splines 15 which co-operate with the splines 14. The hand of the splines is such that when the torque is being transmitted from one shaft to the other, the direction of rotation being indicated by arrow 36, a load is applied to the shaft 10 as indicated by the arrow 16 and a load is applied to the shaft 11 acting in the direction of arrow 17 so that thereby the load tending to separate the shafts 10 and 11 is decreased. It is arranged, however, that the loads produced by the splines are less than those produced in the shafts 10 and 11 due to the operation of, say, the compressor and turbine.

The resultant load tending to separate the shafts 10 and 11 is taken up by a ball-and-socket type interconnection which also allows slight misalignment of the two shafts 10 and 11.

The ball-and-socket type interconnection comprises a sleeve-like part 18 which is threaded on to the external surface of the shaft 10 at its splined end and the sleeve-like part 18 is provided internally with a series of short splines 19 which are helical and of the same hand as the splines 14, 15 on the shafts 10 and 11. Preferably the thread by which the part 18 is connected to the shaft 10 is of square form with radial clearance so as to allow the splines 14, 15 to be concentric with the spherical face 19a despite manufacturing tolerances.

The surfaces 19a of the ends of the splines 19 which are nearer to the splines 14 are machined to be parts of a surface of a sphere having its centre on the axis of rotation of the shafts and having a diameter somewhat greater than the maximum diameter of the splines 19. Corresponding surfaces 15a are formed on the ends remote from the end of the shaft 11 of the parts of splines 15 adjacent the end of shaft 11, by cutting notches 15b in the splines 15 and these parts of splines 15 are made of a length somewhat greater than is necessary for co-operation with the splines 14 so that the spherical surfaced ends 15a are spaced away from the splines 14 when the shafts 10, 11 are coupled. The parts of splines 15 on the side of notches 15b remote from the end of shaft 11 are arranged to face the end faces of splines 19 when the coupling is engaged, in order to prevent telescoping of the shafts 10, 11 e. g. during assembly of the engine.

The sleeve-like part 18 has an axial extension 18a formed at its edge with a stepped notch affording a pair of circumferentially - spaced circumferentially - facing shoulders 20 and 21 and engaged in the notch there is a tooth 22 formed externally of a sleeve 23 slidably mounted on the shaft 11. The sleeve 23 is splined to the shaft 11 through interengaging splines 33, 34 on the sleeve 23 and shaft 11, and is locked axially with respect to the shaft 11 by a spring-loaded press button 24 which engages an aperture 25 in the sleeve 23. With the press button 24 engaged in the aperture 25 the tooth 22 co-operates with the shoulder 20 in the extension 18a of the sleeve-like part 18 and holds the sleeve-like part in a position relative to the shafts 10 and 11 such that the splines 19 are aligned with the splines 15 and the spherical surfaces 19a, 15a are in abutment. These surfaces are loaded into engagement by the difference of the loads represented by the arrows 12 and 16, and 13 and 17.

When the button 24 is depressed against its spring, the sleeve 23 may be withdrawn axially so that the sleeve-like part 18 may be rotated until the tooth 22 abuts against the shoulder 21 thus aligning the splines 19 with the splines 14 and allowing the shaft 10 to be withdrawn from engagement with the shaft 11.

Axial adjustment of shafts 10, 11 relative to one another may be effected by withdrawing shaft 11 until the splines 15 are disengaged from splines 14, but are still engaged with splines 19; rotation of shaft 11 relative to shaft 10 will then cause axial movement of member 18 due to its screw-threaded engagement with shaft 10.

Referring now to Figure 2, the arrangement is suitable for use when the load caused by the helical splines 14, 15 is greater than the loads tending to separate the coupled parts represented by arrows 12, 13 so that the resultant load on the ball-and-socket type connection is one tending to telescope the parts one upon the other or to draw them more closely together.

In this case the coupling again comprises a sleeve-like part 18 threaded to shaft 10 and having splines 19 of helical form and of the same hand as the splines 14, 15 but in this case the discontinuous splines 15 having the notches 15b are formed as internal splines and the splines 14 on shaft 10 as external splines, and the spherical surfaces 19a of the splines 19 are at the ends of splines 19 remote from the shaft 10. The splines 19 have an axial length substantially equal to the axial length of the notches 15b, and as in the previous arrangement, the faces of splines 19 and of notches 15b which are not part-spherical will be aligned so that their abutment will prevent disengagement of shafts 10, 11 in the sense of separation, e. g. during assembly of the engine. The screwthread by which the part 18 is connected to shaft 10 is preferably, as in the construction of Figure 1, of square form with radial clearance.

As in the previous construction, when the splines 19 are aligned with the splines 15 the spherical surfaces 15a, 19a are loaded into abutment by the resultant load tending to telescope the shafts, and when the splines 19 are aligned with the splines 14 the shaft 10 may be disengaged from the shaft 11.

The sleeve-like part 18 is locked relative to the shafts 10 and 11 when in a position such that its splines 19 are aligned with the splines 15, by means of a tubular member 26 accommodated within the shaft 11. The tubular member 26 has at its end teeth 27 to engage with internal splines 28 which are formed on the member 18 and are of greater axial length than the teeth 27, and the tubular member also has teeth 29 formed externally of it in spaced axial relation to the teeth 27; the teeth 29 are engaged with internal teeth 30 on an annular member 31 clamped against the ends of the splines 15 by a threaded ring 32.

To release the coupling, the tubular member 26 is withdrawn slightly axially of the shaft 11 to permit the teeth 29 to become disengaged from the teeth 30 but to allow the teeth 27 to remain in engagement with the splines 28. This permits the tubular member 26 to be used to rotate the sleeve-like part 18 on its thread with respect to the shaft 10 so as to bring the splines 19 into alignment with the splines 14, and thus to permit disengagement of the shafts.

The tubular member 26 may also be used to rotate the part 18 with respect to shaft 10 to effect relative axial adjustment of the two shafts 10, 11.

Referring now to Figure 3, there is illustrated a modified form of the arrangement shown in Figure 2. In this construction, instead of forming the co-operating part-spherical surfaces on the ends of parts of the splines 15 and 19, the part-spherical surface associated with the shaft 10 is formed on that end 18b of the sleeve-like member 18 which is remote from the shaft 10 and is radially inward of splines 19, and the co-operating surface is in this case formed on the end 31a of an axial extension 31b of the member 31. The notches in the splines 15 to allow the splines 19 to come into line with them are conveniently square notches 15c. The member 31 is held against rotation relative to the shaft 11 by teeth 35 which interengage with the splines 15.

Since in each of the constructions above described the axial load to be supported by the cooperating spherical surfaces 15a, 19a, or 18b, 31a is substantially reduced as compared with known arrangements, the maximum radial dimension of the coupling may be reduced.

The two coupling arrangements above described may be employed together in one machine. For instance, the arrangement illustrated in Figure 2 may be employed for coupling shafts which are nested within shafts coupled by the arrangement of Figure 1. Thus, for instance, as illustrated in Figure 4, the arrangement of Figure 1 may be employed to couple the rotors of a high-pressure compressor 40 and a coaxial high-pressure turbine 41, and the arrangement of Figure 2 or of Figure 3 may be arranged to couple the rotors of a low-pressure compressor 42 and a coaxial low-pressure turbine 43, which are located coaxially with the high-pressure compressor 40 and turbine 41 and respectively beyond the ends thereof so that the shafts 210 and 211 of the low-pressure compressor 42 and the low-pressure turbine 43 respectively extend through the shafts 110 and 111 of the high-pressure compressor 40 and the high-pressure turbine 41. The sleeve-like member of the coupling between the shafts 110, 111 is indicated at 118 and the sleeve-like member of the coupling between the shafts 210, 211 is indicated at 218.

I claim:

1. A rotary drive-transmitting coupling for transmitting a drive between two parts whilst accommodating slight misalignment of the rotational axes of the coupled parts, comprising first helical splines on the first of said parts, second helical splines on the second of said parts and interengaging with the first helical splines whereby on torque transmission an axial load is developed tending to displace said parts axially relative to one another, a third part, third helical splines on said third part, said third part being mounted on said first part for angular adjustment relative thereto about its axis between a first position in which said first and third helical splines are aligned and a second position in which they are out of alignment, a first axially-facing part-spherical surface on said third part, a second axially-facing part-spherical surface rigidly supported by said second part adapted to abut axially said first axially-facing part spherical surface at least when said third part is in said second position, and locking means to lock said third part in said second position of angular adjustment.

2. A coupling as claimed in claim 1, wherein said first and third parts have inter-engaging screw-threads, whereby said third part is angularly adjustable relative to said first part.

3. A coupling as claimed in claim 1, wherein said second splines are provided with notches in their length, and said third splines are positioned in said notches when said third part is locked in said second position of angular adjustment.

4. A coupling as claimed in claim 1, wherein the first axially-facing part-spherical surfaces are formed on the ends of the third splines, and the second axially-facing part-spherical surface is formed on the second helical splines.

5. A coupling as claimed in claim 4, wherein said second helical splines are formed with notches in their length, whereby said second splines are divided into axially-spaced parts, and the second part-spherical surfaces are formed on an end surface of one part of the discontinuous splines.

6. A coupling as claimed in claim 1 wherein said second part comprises a first portion with the second helical splines thereon and an annular member formed separate from and secured against relative movement to said first portion of the second part, said annular member having formed thereon said second axially-facing part-spherical surface.

7. A coupling as claimed in claim 1, wherein said locking means comprises a sleeve member axially displaceable on said second part and having a tooth to engage a notch in said third part to prevent rotation of said third part relative to said second part.

8. A coupling as claimed in claim 7, wherein said notch in the third part has a pair of circumferentially-spaced shoulders to co-operate with said tooth on the sleeve, the circumferential spacing of the shoulders being such that, with the tooth in abutment with the first shoulder, the third part is in said second position, and the third splines are in line with the second splines and that, when the tooth is in abutment with the second shoulder, the third part is in said first position with the third splines in line with the first helical splines.

9. A coupling as claimed in claim 8, comprising also a plunger engaging said sleeve and said second part to lock said sleeve in a position with its tooth in abutment with said first shoulder, and a spring to urge said plunger in the locking position.

10. A coupling as claimed in claim 1, wherein said locking means comprises a tubular member having axially-spaced sets of teeth thereon, a set of teeth rigid with said second part to be engaged by one of said sets of teeth on the tubular member, and a set of teeth rigid with said third part to be engaged by a second of said sets of teeth on the tubular member.

11. A coupling as claimed in claim 10, wherein said tubular member is axially displaceable relative to the first and second parts, and the teeth rigid with the third part have an axial extent greater than the axial displacement necessary to effect disengagement of said one set of teeth from the teeth rigid with the second part whereby the tubular member is capable of being withdrawn from toothed engagement with said second part whilst still in toothed engagement with the third part.

12. A rotary drive-transmitting coupling for transmitting a drive between an input shaft and an output shaft whilst accommodating slight misalignment of the rotational axes of the coupled shafts and wherein the coupling is loaded in tension or compression due to axial loads in the coupled shafts, comprising a pair of sets of interengaging helical splines one rigid with one of said shafts and the other rigid with the other of said shafts, whereby torque can be transmitted from said input shaft to said output shaft, and whereof the helix lead relative to the direction of rotation is such that when torque is transmitted further axial loads are generated in said coupled shafts respectively opposing the aforementioned axial loads, means affording a first part-spherical surface which in operation is rigid with one of said coupled shafts and which faces in the direction of the residual axial load on said one shaft, and means affording a second part-spherical surface which in operation is rigid with the other of said coupled shafts and which faces in the direction of the residual axial load on said other shaft and abuts axially against the first part-spherical surface to withstand the residual axial thrust between said coupled shafts.

13. A rotary drive-transmitting coupling for transmitting a drive between an input shaft and an output shaft whilst accommodating slight misalignment of the rotational axes of the coupled shafts and wherein the coupling is loaded in tension or compression due to axial loads in the coupled shafts, comprising first helical splines rigid with one of said shafts, second helical splines rigid with the other of said shafts and interengaging with the first helical splines, whereby on torque transmission axial loads opposing the axial loads in the shafts are developed, a part rigidly engaged in operation with said one shaft but detachable therefrom for dismantling and having formed thereon a first part-spherical surface which faces in the direction of the residual axial load on said one shaft, and a second part-spherical surface on said other shaft which faces in the direction of the residual axial load on said other shaft and which abuts axially against said first part-spherical surface to withstand the resultant axial load between the two shafts.

14. A rotary drive-transmitting coupling for transmitting a drive between an input shaft and an output shaft whilst accommodating slight misalignment of the rotational axes of the coupled shafts and wherein the coupling is loaded in tension or compression due to axial loads in the coupled shafts, comprising a pair of sets of interengaging helical splines the one set on one of said shafts and the other set on the other of said shafts, whereby torque can be transmitted from said input shaft to said output shaft, and whereof the helix lead relative to the direction of rotation is such that when torque is transmitted further axial loads are generated in said shafts respectively opposing the aforementioned axial loads, and further comprising a member secured against axial displacement with respect to one of said shafts and affording a first part-spherical surface which faces in the direction of the residual axial load on said one shaft, releasable means securing said member against circumferential displacement with respect to said one shaft, and means rigid with the other of said shafts and affording a second part-spherical surface which faces in the direction of the residual axial load on said other shaft and abuts axially against said first axially-facing part-spherical surface to withstand the residual axial thrust between said coupled shafts.

15. A rotary drive-transmitting coupling for transmitting a drive between two parts whilst accommodating slight misalignment of the rotational axes of the coupled parts, comprising first helical splines on the first of said parts, second helical splines on the second of said parts and interengaging with the first helical splines whereby on torque transmission an axial load is developed tending to displace said parts axially relative to one another, a third part, third helical splines on said third part, said third part being mounted on said first part for angular adjustment relative thereto about its axis between a first position in which said first and third helical splines are aligned and a second position in which they are out of alignment, a first axially-facing part-spherical surface on said third part, an annular member formed separate from and secured against relative movement to said second part, a second axially-facing part-spherical surface on said annular member adapted to abut axially said first axially-facing part-spherical surface at least when said third part is in said second position, and locking means to lock said third part in said second position of angular adjustment.

References Cited in the file of this patent
UNITED STATES PATENTS

| | | |
|---|---|---|
| 1,381,805 | Drewdson | June 14, 1921 |
| 1,770,744 | Morgan | July 15, 1930 |
| 2,172,662 | Kuhns et al. | Sept. 12, 1939 |
| 2,297,390 | Burger | Sept. 29, 1942 |
| 2,525,695 | Lombard | Oct. 10, 1950 |
| 2,691,875 | Schmitter | Oct. 19, 1954 |